(12) United States Patent
Zhang et al.

(10) Patent No.: US 10,560,723 B2
(45) Date of Patent: Feb. 11, 2020

(54) CONTEXT MODELING FOR TRANSFORM COEFFICIENT CODING

(71) Applicant: QUALCOMM Incorporated, San Diego, CA (US)

(72) Inventors: Li Zhang, San Diego, CA (US); Nan Hu, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/973,327

(22) Filed: May 7, 2018

(65) Prior Publication Data

US 2018/0324463 A1 Nov. 8, 2018

Related U.S. Application Data

(60) Provisional application No. 62/503,218, filed on May 8, 2017.

(51) Int. Cl.
| | | |
|---|---|---|
| *H04N 19/61* | (2014.01) | |
| *H04N 19/70* | (2014.01) | |
| *H04N 19/159* | (2014.01) | |
| *H04N 19/186* | (2014.01) | |
| *H04N 19/103* | (2014.01) | |
| *H04N 19/176* | (2014.01) | |
| *H04N 19/625* | (2014.01) | |

(52) U.S. Cl.
CPC ............ *H04N 19/61* (2014.11); *H04N 19/103* (2014.11); *H04N 19/159* (2014.11); *H04N 19/176* (2014.11); *H04N 19/186* (2014.11); *H04N 19/625* (2014.11); *H04N 19/70* (2014.11)

(58) Field of Classification Search
CPC ........ H04N 19/61; H04N 19/91; H04N 19/13; H04N 19/625; H04N 19/176; H04N 19/159; H04N 19/70; H04N 19/103; H04N 19/186
USPC ................................................... 375/240.12
See application file for complete search history.

(56) References Cited

U.S. PATENT DOCUMENTS

| 6,295,064 B1 | 9/2001 | Yamaguchi |
| 2005/0123207 A1 | 6/2005 | Marpe et al. |
| 2007/0268392 A1 | 11/2007 | Paalasmaa et al. |
| 2009/0305207 A1 | 12/2009 | Ueshima et al. |
| 2010/0007518 A1 | 1/2010 | Kang et al. |

(Continued)

FOREIGN PATENT DOCUMENTS

| EP | 2869563 A1 | 5/2015 |
| WO | 2007008018 A1 | 1/2007 |

OTHER PUBLICATIONS

International Search Report and Written Opinion—PCT/US2018/031634—ISA/EPO—dated Sep. 13, 2018.

(Continued)

*Primary Examiner* — Marnie A Matt
(74) *Attorney, Agent, or Firm* — Shumaker & Sieffert, P.A.

(57) ABSTRACT

A device for coding video data is configured to determine a context for a first syntax element based on already coded information for a current block of video data, wherein a value for the first syntax element indicates whether there is at least one non-zero transform coefficient level associated with the current block of video data; and code the first syntax element based on the determined context.

16 Claims, 12 Drawing Sheets

(56) References Cited

U.S. PATENT DOCUMENTS

| | | | |
|---|---|---|---|
| 2010/0020876 A1 | 1/2010 | Jeon et al. | |
| 2010/0188397 A1 | 7/2010 | Tsai et al. | |
| 2011/0249721 A1* | 10/2011 | Karczewicz | H04N 19/159 375/240.02 |
| 2012/0177118 A1 | 7/2012 | Karczewicz et al. | |
| 2013/0004092 A1 | 1/2013 | Sasai et al. | |
| 2013/0034157 A1* | 2/2013 | Helle | H04N 19/52 375/240.12 |
| 2013/0266074 A1* | 10/2013 | Guo | H04N 19/46 375/240.24 |
| 2013/0272377 A1 | 10/2013 | Karczewicz et al. | |
| 2013/0272389 A1 | 10/2013 | Sze et al. | |
| 2014/0362904 A1* | 12/2014 | Lim | H04N 19/50 375/240.02 |
| 2015/0117546 A1* | 4/2015 | Kim | H04N 19/18 375/240.18 |
| 2015/0189291 A1* | 7/2015 | Kim | H04N 19/18 375/240.18 |
| 2018/0324464 A1 | 11/2018 | Zhang et al. | |

OTHER PUBLICATIONS

Partial International Search Report—PCT/US2018/031634—ISA/EPO—dated Jul. 20, 2018.

Sze V., et al., "Chapter 8: Entropy Coding in HEVC," Jan. 1, 2014 (Jan. 1, 2014), High Efficiency Video Coding (HEVC), Springer International Publishing, XP009500669, ISBN: 978-3-319-06894-7 table 8.1, pp. 209-274.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Chen J., et al., Algorithm Description of Joint Exploration Test Model 5 (JEM 5) Joint Video Exploration Team (JVET) of ITU-T SG 16 WP 3 and ISO/IEC JTC 1/SC 29/WG 11, 5th Meeting: Geneva, Jan. 12-20, 2017, JVET-E1001-v2, 44 pages.

ITU-T H.223, Series H: Audiovisual and Multimedia Systems "Multiplexing Protocol for Low Bit Rate Multimedia Communication," Jul. 2001, pp. 1-74.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-O0024, 5 pp.

Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

U.S. Appl. No. 15/973,347, filed by Li Zhang et al., filed May 7, 2018.

* cited by examiner

CONTEXT MODELING FOR TRANSFORM COEFFICIENT CODING

This application claims the benefit of U.S. Provisional Patent Application 62/503,218, filed 8 May 2017, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to context modeling in video codecs and, more specifically, describes techniques for selecting contexts for syntax elements based on already coded information. The techniques of this disclosure may, for example, be used to perform context modeling for Context-Adaptive Binary Arithmetic Coding (CABAC) or other context adaptive coding methods.

According to one example, a method of for coding video data includes determining a context for a first syntax element based on already coded information for a current block of video data, wherein a value for the first syntax element indicates whether there is at least one non-zero transform coefficient level associated with the current block of video data; and coding the first syntax element based on the determined context.

According to another example, a device for coding video data includes a memory; and one or more processors configured to determine a context for a first syntax element based on already coded information for a current block of video data, wherein a value for the first syntax element indicates whether there is at least one non-zero transform coefficient level associated with the current block of video data; and code the first syntax element based on the determined context.

According to another example, apparatus for coding video data includes means for determining a context for a first syntax element based on already coded information for a current block of video data, wherein a value for the first syntax element indicates whether there is at least one non-zero transform coefficient level associated with the current block of video data; and means for coding the first syntax element based on the determined context.

According to another example, computer-readable storage medium stores instructions that when executed cause one or more processors to determine a context for a first syntax element based on already coded information for a current block of video data, wherein a value for the first syntax element indicates whether there is at least one non-zero transform coefficient level associated with the current block of video data; and code the first syntax element based on the determined context.

The details of one or more examples of the disclosure are set forth in the accompanying drawings and the description below. Other features, objects, and advantages will be apparent from the description, drawings, and claims.

DETAILED DESCRIPTION

This disclosure describes techniques related to context modeling in video codecs and, more specifically, describes techniques for selecting contexts for syntax elements based on already coded information. The techniques of this disclosure may, for example, be used to perform context modeling for Context-Adaptive Binary Arithmetic Coding (CABAC) or other context adaptive coding methods. The techniques of this disclosure may be applied to any of the existing video codecs, such as High Efficiency Video Coding (HEVC), or may be an efficient coding tool for a future video coding standard, such as a successor standard to HEVC or an extension to HEVC.

Various techniques in this disclosure may be described with reference to coding, which is intended to be a generic term that can refer to either encoding or decoding. Likewise, the term coder may refer to either an encoder or a decoder. Unless explicitly stated otherwise, it should not be assumed that techniques described with respect to a video encoder or a video decoder cannot be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder, and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

Figure 1:
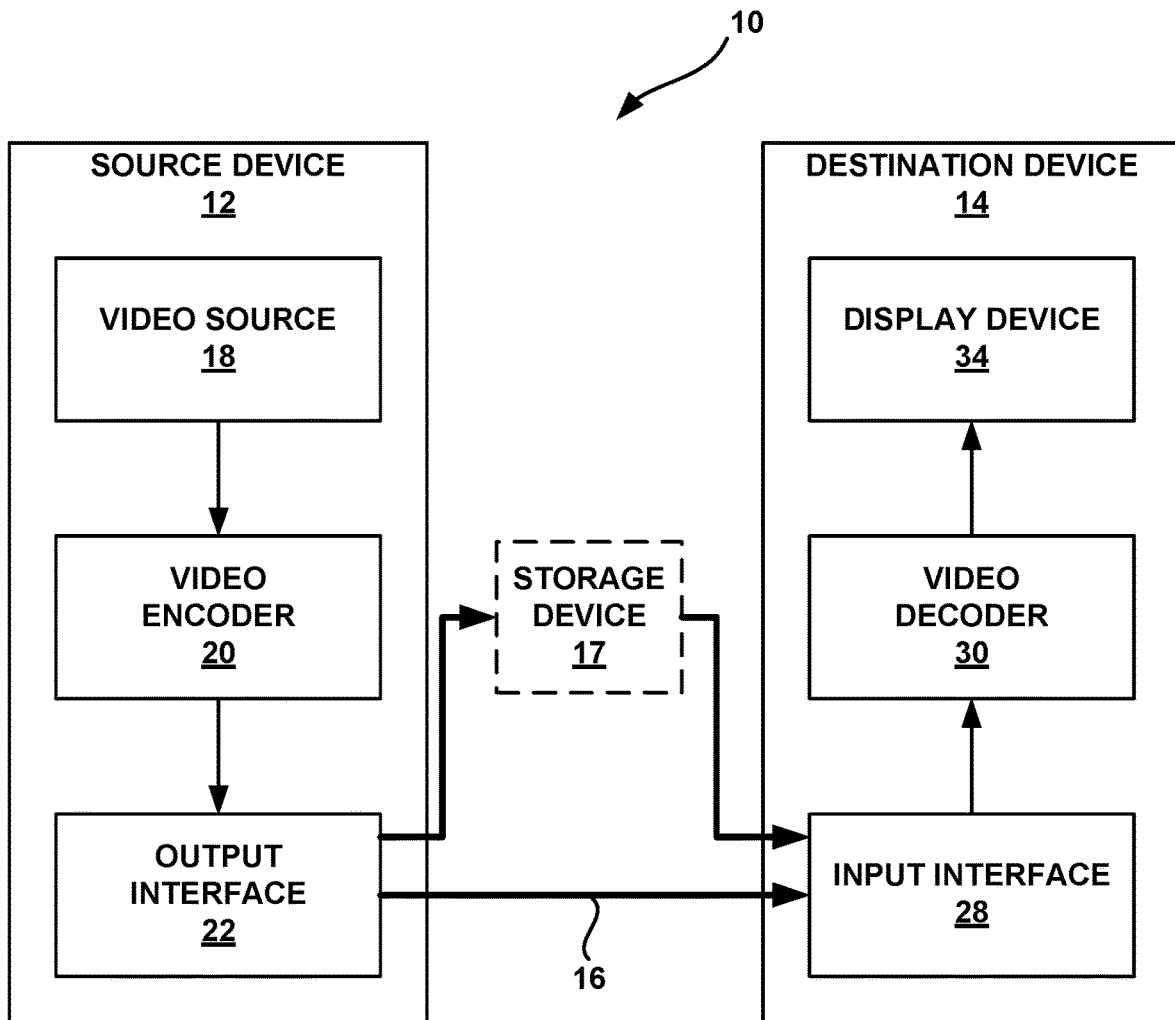
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure, including techniques for encoding and decoding blocks in an intra prediction mode. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 17. Similarly, encoded data may be accessed from storage device 17 by input interface. Storage device 17 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 17 may correspond to a file server or another intermediate storage device that may hold the encoded video generated by source device 12. Destination device 14 may access stored video data from storage device 17 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 17 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 17 for later access by destination device 14 or other devices, for decoding and/or playback.

Destination device 14 includes an input interface 28, a video decoder 30, and a display device 34. In some cases, input interface 28 may include a receiver and/or a modem. Input interface 28 of destination device 14 receives the encoded video data over link 16. The encoded video data communicated over link 16, or provided on storage device 17, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may be any of a variety of display devices such as a liquid crystal display (LCD), a plasma display, an organic light emitting diode (OLED) display, or another type of display device.

Video encoder 20 and video decoder 30 may operate according to a video compression standard, such as HEVC. HEVC, also referred to as ITU-T H.265, including its range extension, multiview extension (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC standard, referred to as HEVC hereinafter, is identified as Recommendation ITU-T H.265, Series H: Audiovisual and Multimedia Systems, Infrastructure of audiovisual services—Coding of moving video, High efficiency video coding, December 2016. The latest HEVC draft specification is available from http://phenix.int-evry.fr/jct/doc_end_user/documents/14_Vienna/wg11/JCTVC-N1003-v1.zip. The latest HEVC draft including several extensions is available from: http://phenix.it-sudparis.eu/jct/doc_end_user/current_document.php?id=10481.

Alternatively or additionally, video encoder 20 and video decoder 30 may operate according to other future or existing proprietary or industry standards, such as the ITU-T H.264 standard, also referred to as MPEG-4, Part 10, Advanced Video Coding (AVC), or extensions of such standards. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Video coding standards also include proprietary video codecs, such as VP8, VP9, VP10, and video codecs developed by other organizations such as, for example, the Alliance for Open Media.

ITU-T VCEG (Q6/16) and ISO/IEC MPEG (JTC 1/SC 29/WG 11) are now studying the potential for standardization of future video coding technology with a compression capability that potentially exceeds that of the current HEVC standard (including its current extensions and near-term extensions for screen content coding and high-dynamic-range coding). The groups are working together on this exploration activity in joint collaboration efforts known as the Joint Video Exploration Team (WET) to evaluate compression technology designs proposed by their experts in this area. The JVET first meeting was held during 19-21 Oct. 2015. The latest version of JVET reference software, i.e., Joint Exploration Model 5 (JEM 5) can be downloaded from: https://jvet.hhi.fraunhofer.de/svn/svn_HMJEMSoftware/tags/HM-16.6-JEM-5.0/. An algorithm description of JEM5 may be referred to as JVET-E1001.

It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards. Some of the techniques of this disclosure may be described utilizing HEVC terminology for ease of explanation. Such techniques, however, are not necessarily limited to HEVC, and in fact, it is explicitly contemplated that such techniques may be applicable to future standards such as successor standards to HEVC.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As introduced above, the JCT-VC has recently finalized development of the HEVC standard. In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may include a coding tree block (CTB) of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform CABAC on the syntax elements indicating the quantized transform coefficients.

Video encoder 20 may output a bitstream that includes a sequence of bits that forms a representation of coded pictures and associated data. The bitstream may include a sequence of network abstraction layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As introduced above, in HEVC, the largest coding unit in a slice may be called a CTB. A CTB contains a quad-tree of the nodes of which are coding units. The size of a CTB can be in ranges from 16×16 to 64×64 in the HEVC main profile (although technically 8×8 CTB sizes can be supported). A CU can be the same size of a CTB though and as small as 8×8. Each coding unit is coded with one mode. When a CU is inter coded, the CU may be further partitioned into 2 or 4 PUs or become just one PU without further partitioning. When two PUs are present in one CU, the two PUs can be half size rectangles or two rectangles with ¼ and ¾ the size of the CU, respectively.

When the CU is inter coded, one set of motion information is present for each PU. In addition, each PU is coded with a unique inter-prediction mode to derive the set of motion information.

A PU is a region, defined by partitioning the CU, on which the same prediction is applied. In general, the PU is not restricted to being square in shape, in order to facilitate partitioning which matches the boundaries of real objects in the picture.

Figure 2:
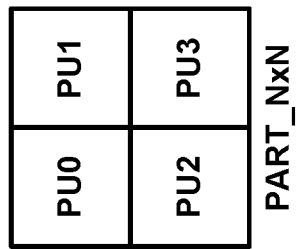
FIG. 2 shows an example of 8 partition modes for an inter-coded CU.
Figure 2:
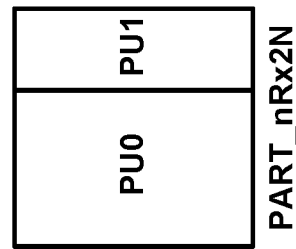
Figure 2:
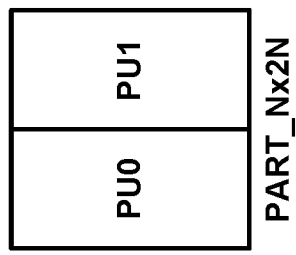
Figure 2:
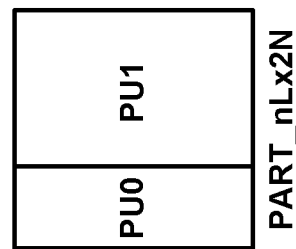
Figure 2:
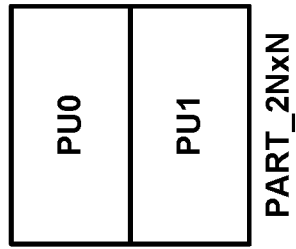
Figure 2:
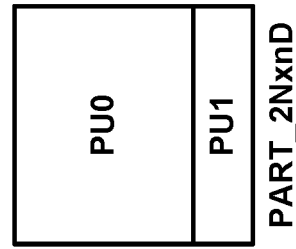
Figure 2:
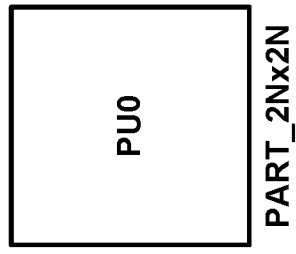
Figure 2:
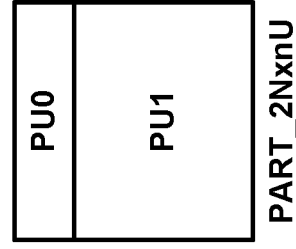

FIG. 2 shows an example of 8 partition modes for an inter-coded CU. Each CU contains one, two or four PUs depending on the partition mode. FIG. 2 illustrates the eight partition modes that may be used to define the PUs for an inter-coded CU. The PART_2N×2N and PART_N×N partition modes are used for an intra-coded CU. The partition mode PART_N×N is allowed only when the corresponding CU size is equal to the minimum CU size.

Merge flags for an inter predicted prediction unit will now be described. A merge flag of an inter predicted prediction unit equal to 1 specifies that the motion information (motion vector and reference index) is the same as one candidate. In this case, only the candidate index is signaled in the bitstream rather than the actual motion information.

Table 7.3.8.6 of the HEVC standard, shown below, shows an example of prediction unit syntax.

| 7.3.8.6 Prediction unit syntax | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |

-continued

| 7.3.8.6 Prediction unit syntax | Descriptor |
|---|---|
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if(mvd_l1_zero_flag && | |
|           inter_pred_idc[ x0 ][ y0 ] == | |
|           PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |
|         mvp_l1_flag[ x0 ][ y0 ] | ae(v) |
|       } | |
|     } | |
|   } | |
| } | |

Aspects of a TU and transform tree structure will now be described. Each CU corresponds to one transform tree, which is a quad-tree, the leaf of which is a transform unit.

The transform unit (TU) is a square region, defined by quadtree partitioning of the CU, which shares the same transform and quantization processes. The quadtree structure of multiple TUs within a CU is illustrated in FIG. 3.

Figure 3:
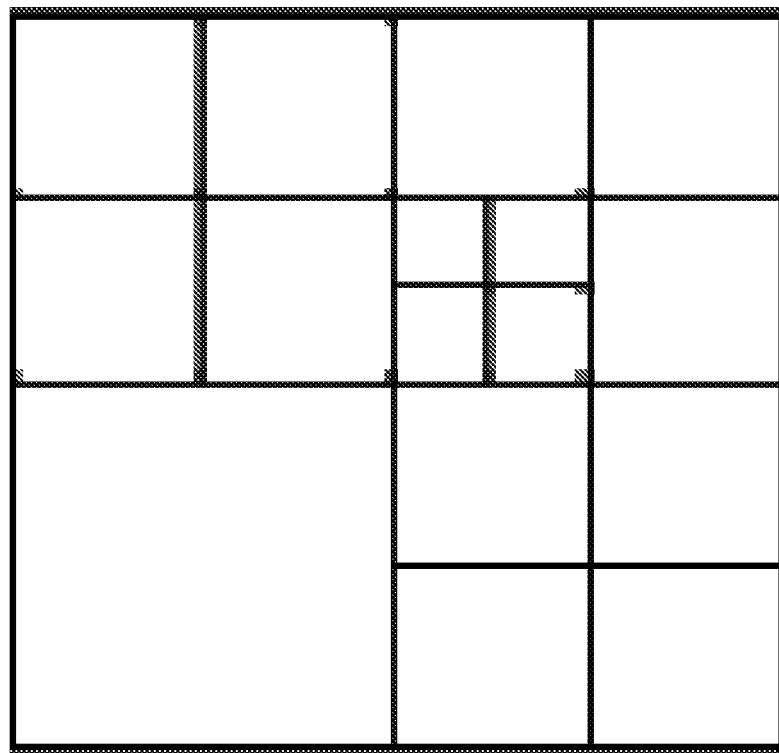
FIG. 3 shows an example of a transform tree structure within a CU.

FIG. 3 shows an example of a transform tree structure within a CU. In the example of FIG. 3, the TU shape is always square and may take a size from 32×32 down to 4×4 samples. The maximum quadtree depth is adjustable and is specified in the slice header syntax. For an inter CU, the TU can be larger than the PU, i.e., the TU may contain PU boundaries. However, the TU cannot cross PU boundaries for an intra-coded CU.

Rqt_root_cbf equal to 1 specifies that the transform_tree syntax structure is present for the current coding unit. rqt_root_cbf equal to 0 specifies that the transform_tree syntax structure is not present for the current coding unit. When rqt_root_cbf is not present, its value is inferred to be equal to 1.

When rqt_root_cbf is equal to 0, the transform_tree only contains one node, meaning the node is not further split and the split_transform_flag is equal to 0. In addition, when rqt_root_cbf is equal to 0, there is no need to perform a transform for the CU. A node inside a transform tree that has split_transform_flag equal to 1 is further split into four nodes. A leaf of the transform tree has a split_transform_flag equal to 0.

For simplicity, if a transform unit or transform tree corresponds to a block which does not have a transform, a transform tree or transform unit is still treated as a transform tree or transform unit because the hierarchy of the transform itself still exists. Typically, a transform skipped block is within a transform unit.

Aspect of coded block flag (cbf) of a TU will now be described. A cbf of a transform unit equal to 1 specifies that the transform unit contains one or more transform coefficient levels not equal to 0. The value of cbf of a transform unit equal to 0 specifies that all transform coefficient levels of the transform unit are 0. The value of cbf is set for each component of the transform unit, i.e., the value of cbf is set for luma, cb and cr component respectively.

Table 7.3.8.5 of the HEVC standard below shows an example of CU syntax.

| 7.3.8.5 Coding unit syntax | |
|---|---|
| | Descriptor |
| coding_unit( x0, y0, log2CbSize ) { | |
| ... | |
|     if( !pcm_flag[ x0 ][ y0 ] ) { | |
|       if( CuPredMode[ x0 ][ y0 ] != MODE_INTRA && | |
|         !( PartMode == PART_2Nx2N && merge_flag[ x0 ][ y0 ] ) ) | |
|         rqt_root_cbf | ae(v) |
|       if( rqt_root_cbf ) { | |
|         MaxTrafoDepth = ( CuPredMode[ x0 ][ y0 ] == MODE_INTRA ? | |
|           ( max_transform_hierarchy_depth_intra + IntraSplitFlag ) : | |
|           max_transform_hierarchy_depth_inter ) | |
|         transform_tree( x0, y0, x0, y0, log2CbSize, 0, 0 ) | |
|       } | |
|     } | |
|     } | |
| } | |

Table 7.3.8.8 of the HEVC standard below shows an example of transform tree syntax.

| 7.3.8.8 Transform tree syntax | |
|---|---|
| | Descriptor |
| transform_tree( x0, y0, xBase, yBase, log2TrafoSize, trafoDepth, blkIdx ) { | |
|   if( log2TrafoSize <= MaxTbLog2SizeY && | |
|     log2TrafoSize > MinTbLog2SizeY && | |
|     trafoDepth < MaxTrafoDepth && !(IntraSplitFlag && (trafoDepth == 0 ) ) ) | |
|     split_transform_flag[ x0 ][ y0 ][ trafoDepth ] | ae(v) |
|   if( ( log2TrafoSize > 2 && ChromaArrayType != 0 ) \|\| ChromaArrayType == 3 ) { | |
|     if( trafoDepth == 0 \|\| cbf_cb[ xBase ][ yBase ][ trafoDepth − 1 ] ) { | |
|       cbf_cb[ x0 ][ y0 ][ trafoDepth ] | ae(v) |
|       if( ChromaArrayType == 2 && | |
|         ( !split_transform_flag[ x0 ][ y0 ][ trafoDepth ] \|\| log2TrafoSize == 3 ) ) | |
|         cbf_cb[ x0 ][ y0 + ( 1 << ( log2TrafoSize − 1 ) ) ][ trafoDepth ] | ae(v) |
|     } | |
|     if( trafoDepth == 0 \|\| cbf_cr[ xBase ][ yBase ][ trafoDepth − 1 ] ) { | |
|       cbf_cr[ x0 ][ y0 ][ trafoDepth ] | ae(v) |
|       if( ChromaArrayType == 2 && | |
|         ( !split_transform_flag[ x0 ][ y0 ][ trafoDepth ] \|\| log2TrafoSize == 3 ) ) | |
|         cbf_cr[ x0 ][ y0 + ( 1 << ( log2TrafoSize − 1 ) ) ][ trafoDepth ] | ae(v) |
|     } | |
|   } | |
|   if( split_transform_flag[ x0 ][ y0 ][ trafoDepth ] ) { | |
|     x1 = x0 + ( 1 << ( log2TrafoSize − 1 ) ) | |
|     y1 = y0 + ( 1 << ( log2TrafoSize − 1 ) ) | |
|     transform_tree( x0, y0, x0, y0, log2TrafoSize − 1, trafoDepth + 1, 0 ) | |
|     transform_tree( x1, y0, x0, y0, log2TrafoSize − 1, trafoDepth + 1, 1 ) | |
|     transform_tree( x0, y1, x0, y0, log2TrafoSize − 1, trafoDepth + 1, 2) | |
|     transform_tree( x1, y1, x0, y0, log2TrafoSize − 1, trafoDepth + 1, 3 ) | |
|   } else { | |
|     if( CuPredMode[ x0 ][ y0 ] == MODE_INTRA \|\| trafoDepth != 0 \|\| | |
|       cbf_cb[ x0 ][ y0 ][ trafoDepth ] \|\| cbf_cr[ x0 ][ y0 ][ trafoDepth ] \|\| | |
|       ( ChromaArrayType == 2 && | |
|         ( cbf_cb[ x0 ][ y0 + ( 1 << ( log2TrafoSize −1 ) ) ][ trafoDepth ] \|\| | |
|           cbf_cr[ x0 ][ y0 + ( 1 << ( log2TrafoSize − 1 ) ) ][ trafoDepth ] ) ) ) | |
|       cbf_luma[ x0 ][ y0 ][ trafoDepth ] | ae(v) |
|     transform_unit( x0, y0, xBase, yBase, log2TrafoSize, trafoDepth, blkIdx ) | |
|   } | |
| } | |

Section 7.4.9.8 of the HEVC standard describes the transform tree semantics as follows:
split_transform_flag[x0][y0][trafoDepth] specifies whether a block is split into four blocks with half horizontal and half vertical size for the purpose of transform coding. The array indices x0, y0 specify the location (x0, y0) of the top-left luma sample of the considered block relative to the top-left luma sample of the picture. The array index trafoDepth specifies the current subdivision level of a coding block into blocks for the purpose of transform coding. trafoDepth is equal to 0 for blocks that correspond to coding blocks.
The variable interSplitFlag is derived as follows:
If max_transform_hierarchy_depth_inter is equal to 0 and CuPredMode[x0][y0] is equal to MODE_INTER and PartMode is not equal to PART_2N×2N and trafoDepth is equal to 0, interSplitFlag is set equal to 1.
Otherwise, interSplitFlag is set equal to 0.
When split_transform_flag[x0][y0][trafoDepth] is not present, it is inferred as follows:
If one or more of the following conditions are true, the value of split_transform_flag[x0][y0][trafoDepth] is inferred to be equal to 1:
log 2TrafoSize is greater than MaxTbLog2SizeY.
IntraSplitFlag is equal to 1 and trafoDepth is equal to 0.
interSplitFlag is equal to 1.
Otherwise, the value of split_transform_flag[x0][y0][trafoDepth] is inferred to be equal to 0.
cbf_luma[x0][y0][trafoDepth] equal to 1 specifies that the luma transform block contains one or more transform coefficient levels not equal to 0. The array indices x0, y0 specify the location (x0, y0) of the top-left luma sample of the considered transform block relative to the top-left luma sample of the picture. The array index trafoDepth specifies the current subdivision level of a coding block into blocks for the purpose of transform coding. trafoDepth is equal to 0 for blocks that correspond to coding blocks. When cbf_luma[x0][y0][trafoDepth] is not present, it is inferred to be equal to 1.
cbf_cb[x0][y0][trafoDepth] equal to 1 specifies that the Cb transform block contains one or more transform coefficient levels not equal to 0. The array indices x0, y0 specify the top-left location (x0, y0) of the considered transform block. The array index trafoDepth specifies the current subdivision level of a coding block into blocks for the purpose of transform coding. trafoDepth is equal to 0 for blocks that correspond to coding blocks. When cbf_cb[x0][y0][trafoDepth] is not present, it is inferred to be equal to 0.

cbf_cr[x0][y0][trafoDepth] equal to 1 specifies that the Cr transform block contains one or more transform coefficient levels not equal to 0. The array indices x0, y0 specify the top-left location (x0, y0) of the considered transform block. The array index trafoDepth specifies the current subdivision level of a coding block into blocks for the purpose of transform coding. trafoDepth is equal to 0 for blocks that correspond to coding blocks. When cbf_cr[x0][y0][trafoDepth] is not present, it is inferred to be equal to 0.

Table 9-4 below shows an association of context index (ctxIdx) and syntax elements for each initializationType in the initialization process.

TABLE 9-4

| | | | initType | | |
|---|---|---|---|---|---|
| Syntax structure | Syntax element | ctxTable | 0 | 1 | 2 |
| transform_tree( ) | split_transform_flag[ ][ ][ ] | Table 9-20 | 0 . . . 2 | 3 . . . 5 | 6 . . . 8 |
| | cbf_luma[ ][ ][ ] | Table 9-21 | 0 . . . 1 | 2 . . . 3 | 4 . . . 5 |
| | cbf_cb[ ][ ][ ], cbf_cr[ ][ ][ ] | Table 9-22 | 0 . . . 3 | 4 . . . 7 | 8 . . . 11 |

Table 9-21 below shows an example of values of initValue for ctxIdx of cbf_luma.

TABLE 9-21

| Initialization | ctxIdx of cbf_luma | | | | | |
|---|---|---|---|---|---|---|
| variable | 0 | 1 | 2 | 3 | 4 | 5 |
| initValue | 111 | 141 | 153 | 111 | 153 | 111 |

Table 9-22 below shows an example of values of initValue for ctxIdx of cbf_cb and cbf_cr.

TABLE 9-22

| Initialization | ctxIdx of cbf_cb and cbf_cr | | | | | | | | | | | |
|---|---|---|---|---|---|---|---|---|---|---|---|---|
| variable | 0 | 1 | 2 | 3 | 4 | 5 | 6 | 7 | 8 | 9 | 10 | 11 |
| initValue | 94 | 138 | 182 | 154 | 149 | 107 | 167 | 154 | 149 | 92 | 167 | 154 |

Aspects of context modeling will now be described. More than 1 context may be used to code cbf. More specifically, the transform depth may be utilized to select the context index. Detailed information can be found in the table below. More specifically, the selection of cbf_luma is depending on whether the transform depth (i.e., trafoDepth) is equal to 0 or not, while the selection of cbf_cb and cbf_cr is depending on the transform depth. In HEVC, the transform depth could be from 0 to 3; therefore, 4 contexts may be used to code cbf_cb and cbf_cr.

Table 9-48 below shows an assignment of context index increment (ctxInc) to syntax elements with context coded bins.

TABLE 9-48

| cbf_cb[ ][ ][ ] | trafoDepth | na | na | na | na | na |
| cbf_cr[ ][ ][ ] | trafoDepth | na | na | na | na | na |
| cbf_luma[ ][ ][ ] | trafoDepth = = 0 ? 1 : 0 | na | na | na | na | na |

QTBT structure, as described in H. Huang, K. Zhang, Y.-W. Huang, S. Lei, "EE2.1: Quadtree plus binary tree structure integration with JEM tools", JVET-O0024, June, 2016, which is incorporated herein in its entirety, is adopted in the JEM software. In the QTBT structure, a coding tree block (CTB) is firstly partitioned by a quadtree structure. The quadtree leaf nodes are further partitioned by a binary tree structure. The binary tree leaf nodes, namely coding blocks (CBs), are used for prediction and transform without any further partitioning. For P and B slices, the luma and chroma CTBs in one coding tree unit (CTU) share the same QTBT structure. For an I slice, the luma CTB is partitioned into CBs by a QTBT structure, and two chroma CTBs are partitioned into chroma CBs by another QTBT structure.

A CTU (or CTB for I slice), which is the root node of a quadtree, is firstly partitioned by a quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), then the quadtree leaf node can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node, namely CU (or CB for I slice), will be used for prediction (e.g. intra-picture or inter-picture prediction) and transform without any further partitioning. That is, in the QTBT structure, the concepts of CU/PU/TU is aligned and the three are always the same.

There are two splitting types in the binary tree splitting: symmetric horizontal splitting and symmetric vertical splitting.

In one example of the QTBT partitioning structure, the CTU size is set to 128×128 (luma samples and corresponding 64×64 Cb/Cr samples), the MinQTSize is set to 16×16, the MaxBTSize is set to 64×64, the MinBTSize (for both width and height) is set to 4, and the MaxBTDepth is set to 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, then the leaf quadtree now is not further split by the binary tree because the size exceeds the MaxBTSize (i.e., 64×64). Otherwise, the leaf quadtree node will be further partitioned by the binary tree. Therefore, the quadtree leaf node is also the root node for the binary tree and its binary tree depth is defined as 0. The binary tree depth reaching MaxBTDepth (i.e., 4) implies no further splitting. The binary tree node having a width equal to MinBTSize (i.e., 4) implies no further horizontal splitting. Similarly, the binary tree node having a height equal to MinBTSize implies no further vertical splitting. The leaf nodes of the binary tree, namely CUs, are further processed by prediction and transform without any further partitioning.

Figures 4A, 4B:
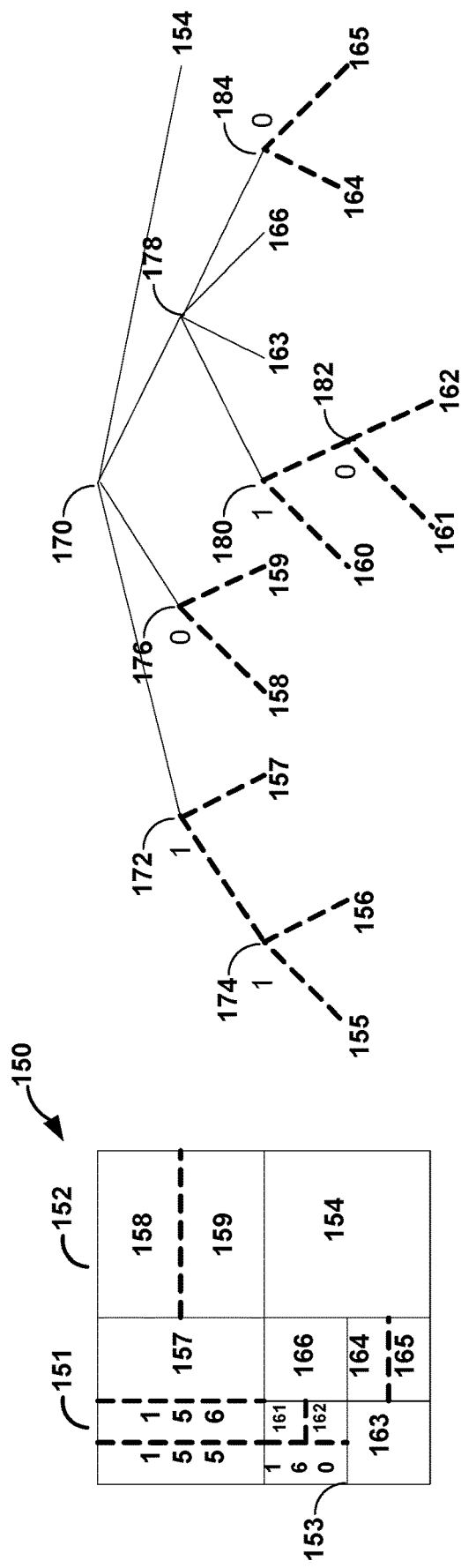
FIG. 4A is a conceptual diagram illustrating an example of block partitioning using a quad-tree-binary-tree (QTBT) structure.
FIG. 4B is a conceptual diagram illustrating an example tree structure corresponding to the block partitioning using the QTBT structure of FIG. 4A.

FIG. 4A illustrates an example of block partitioning by using QTBT, and FIG. 4B illustrates the corresponding tree structure. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type because blocks always split horizontally and vertically into 4 sub-blocks of equal size.

FIG. 4A illustrates an example of a block 150 (e.g., a CTB) partitioned using QTBT partitioning techniques. As shown in FIG. 4A, using QTBT partition techniques, each of the resultant blocks is split symmetrically through the center of each block. FIG. 4B illustrates the tree structure corresponding to the block partitioning of FIG. 4A. The solid lines in FIG. 4B indicate quad-tree splitting and dotted lines indicate binary-tree splitting. In one example, in each splitting (i.e., non-leaf) node of the binary-tree, a syntax element (e.g., a flag) is signaled to indicate the type of splitting performed (e.g., horizontal or vertical), where 0 indicates horizontal splitting and 1 indicates vertical splitting. For the quad-tree splitting, there is no need to indicate the splitting type, as quad-tree splitting always splits a block horizontally and vertically into 4 sub-blocks with an equal size.

As shown in FIG. 4B, at node 170, block 150 is split into the four blocks 151, 152, 153, and 154, shown in FIG. 4A, using QT partitioning. Block 154 is not further split, and is therefore a leaf node. At node 172, block 151 is further split into two blocks using BT partitioning. As shown in FIG. 4B, node 172 is marked with a 1, indicating vertical splitting. As such, the splitting at node 172 results in block 157 and the block including both blocks 155 and 156. Blocks 155 and 156 are created by a further vertical splitting at node 174. At node 176, block 152 is further split into two blocks 158 and 159 using BT partitioning.

At node 178, block 153 is split into 4 equal size blocks using QT partitioning. Blocks 163 and 166 are created from this QT partitioning and are not further split. At node 180, the upper left block is first split using vertical binary-tree splitting resulting in block 160 and a right vertical block. The right vertical block is then split using horizontal binary-tree splitting into blocks 161 and 162. The lower right block created from the quad-tree splitting at node 178 is split at node 184 using horizontal binary-tree splitting into blocks 164 and 165.

For an I slice, a luma-chroma-separated block partitioning structure is proposed. The luma component of one CTU (i.e., the luma CTB) is partitioned by a QTBT structure into luma CBs, and the two chroma components of that CTU (i.e., the two chroma CTBs) are partitioned by another QTBT structure into chroma CBs.

For P and B slice, the block partitioning structure for luma and chroma is shared. That is, one CTU (including both luma and chroma) is partitioned by one QTBT structure into CUs.

Context modeling for cbf in QTBT will now be described. In QTBT, the context modeling of cbf is still dependent on the transform depth. However, the transform size is always equal to the CU/PU size in QTBT, that is, the transform depth is always set to 0. Therefore, only one context is used for one slice type for coding cbf_luma; and another context is used to code cbf_cb and cbf_cr together. In JEM, only one context is used for coding a merge flag.

The design of context modeling in JEM may have some potential problems. As one example, one context may not be able to capture the different characteristics of cbf distributions under different modes. According to offline statistics, the chance of cbf being equal to 1 for intra coded luma blocks is typically higher than that for inter coded luma blocks for video blocks coded with the same quantization parameter. As another example of a potential problem, the relationship between cbf and other syntax elements is not currently utilized.

This disclosure described techniques that may address the above problems. Some of the techniques of this disclosure may be combined. Additionally, the proposed techniques may not be restricted to coding structures where a TU is always equal (e.g., in size and shape) to a corresponding CU/PU.

According to techniques of this disclosure, video encoder 20 and video decoder 30 may perform context modeling of the syntax element that indicates whether there is at least one non-zero transform coefficient level in a block (e.g., cbf_luma/cbf_cb/cbf_cr in HEVC specification) that is dependent on coded information. The coded information may, for example, be defined as the coding mode, for example, intra or inter coded modes. Therefore, blocks within a slice/picture coded with intra or inter modes may utilize different contexts to code the syntax element. Additionally or alternatively, the coded information may be defined as block sizes. For purposes of example, it can be assumed that the transform block size is denoted by W*H, with W indicating the width of the transform block and H indicating the height of the transform block. In one example, the coded information may be defined as log 2(W)+log 2(H) or W*H or min(W, H) or max(W, H). Additionally or alternatively, the coded information may be defined as the shape of transform blocks, e.g., square or non-square; or defined as the transform types. The same context modeling method may be applied to select contexts for different color components although the contexts may be separated for different color components.

According to other techniques of this disclosure, video encoder 20 and video decoder 30 may use transform coefficient level information of neighboring blocks to code some syntax elements of current blocks. If neighboring blocks have few non-zero quantized coefficients, a current block is probable to be a stable area, i.e., an area which is easy to predict due to low low residual energy, which may be indicative of low spatial variance or low temporal variance. In one example, video encoder 20 and video decoder 30 may use cbf values of neighboring blocks to select contexts for coding the merge flag. In another example, video encoder 20 and video decoder 30 may use cbf values of neighboring blocks to select contexts for prediction mode. In one example, the neighboring blocks are those blocks which are adjacent to current block within current slice/tile/picture. In one example, the neighboring block may be the co-located block in a reference picture or adjacent neighboring blocks of the co-located block.

Examples of context modeling of cbf depending on coded modes will now be described. The tables below have been modified, compared to the like-numbered tables above, in accordance with techniques of this disclosure.

TABLE 9-4

Association of ctxIdx and syntax elements for each initializationType in the initialization process

| Syntax structure | Syntax element | ctxTable | initType 0 | 1 | 2 |
|---|---|---|---|---|---|
| transform_tree( ) | split_transform_flag[ ][ ][ ] | Table 9-20 | 0...2 | 3...5 | 6...8 |
|  | cbf_luma[ ][ ][ ] | Table 9-21 | 0...1 | 2...3 | 4...5 |
|  | cbf_cb[ ][ ][ ], cbf_cr[ ][ ][ ] | Table 9-22 | 0...1 | 2...3 | 4...5 |

TABLE 9-21

Values of initValue for ctxIdx of cbf_luma

| Initialization | ctxIdx of cbf_luma | | | | | |
|---|---|---|---|---|---|---|
| variable | 0 | 1 | 2 | 3 | 4 | 5 |
| initValue | 141 | 141 | 111 | 111 | 111 | 111 |

TABLE 9-22

Values of initValue for ctxIdx of cbf_cb and cbf_cr

| Initialization | ctxIdx of cbf_cb and cbf_cr | | | | | |
|---|---|---|---|---|---|---|
| variable | 0 | 1 | 2 | 3 | 4 | 5 |
| initValue | 94 | 94 | 149 | 149 | 149 | 149 |

Video encoder 20 and video decoder 30 may perform context modeling as described in more detail below. More than 1 context may be used to code cbf. More specifically, the transform depth may be utilized to select the context index. Detailed example information is shown in the table below.

The selection of cbf_luma is depending on whether the transform depth (i.e., trafoDepth) is equal to 0 or not, while the selection of cbf_cb and cbf_cr is depending on the transform depth. In HEVC, the transform depth could be from 0 to 3; therefore, 4 contexts may be used to code cbf_cb and cbf_cr.

Table 9-48 below shows an example of assignment of ctxInc to syntax elements with context coded bins, as updated based on the techniques of this disclosure.

TABLE 9-48

| cbf_cb[ ][ ][ ] | codedMode | na | na | Na | na | na |
|---|---|---|---|---|---|---|
| cbf_cr[ ][ ][ ] | codedMode == Intra ? 0 : 1 | na | na | Na | na | na |
| cbf_luma[ ][ ][ ] | codedMode == Intra ? 0 : 1 | Na | na | Na | na | na |

Video encoder 20 and video decoder 30 may perform context modeling for a merge flag. More than one context may be used to code a merge flag. According to one example, the cbfs from two neighbour (left and top) luma blocks may be utilized, ctxInc=cbf_top+cbf_left Video encoder 20 and video decoder 30 may perform context modeling for a cbf depending on TU sizes. Compared to large blocks, small blocks are easier to predict. As such, small blocks are more probable to have fewer non-zero quantized coefficients. The context modeling of cbf can depend on TU sizes.

Denote the width and height of a TU by W and H, respectively. In one example, Table 9-48 can be refined as:

TABLE 9-48

Assignment of ctxInc to syntax elements with context coded bins

| | | | | | | |
|---|---|---|---|---|---|---|
| cbf_cb[ ][ ][ ] | (codedMode == inter \|\| log2(W)+log2(H) <= 6) ? 0 : 1 | na | na | na | na | na |
| cbf_cr[ ][ ][ ] | (codedMode == inter \|\| log2(W)+log2(H) <= 6) ? 0 : 1 | na | na | na | na | na |
| cbf_luma[ ][ ][ ] | (codedMode == inter \|\| log2(W)+log2(H) <= 6) ? 0 : 1 | na | na | na | na | na |

Figure 5:
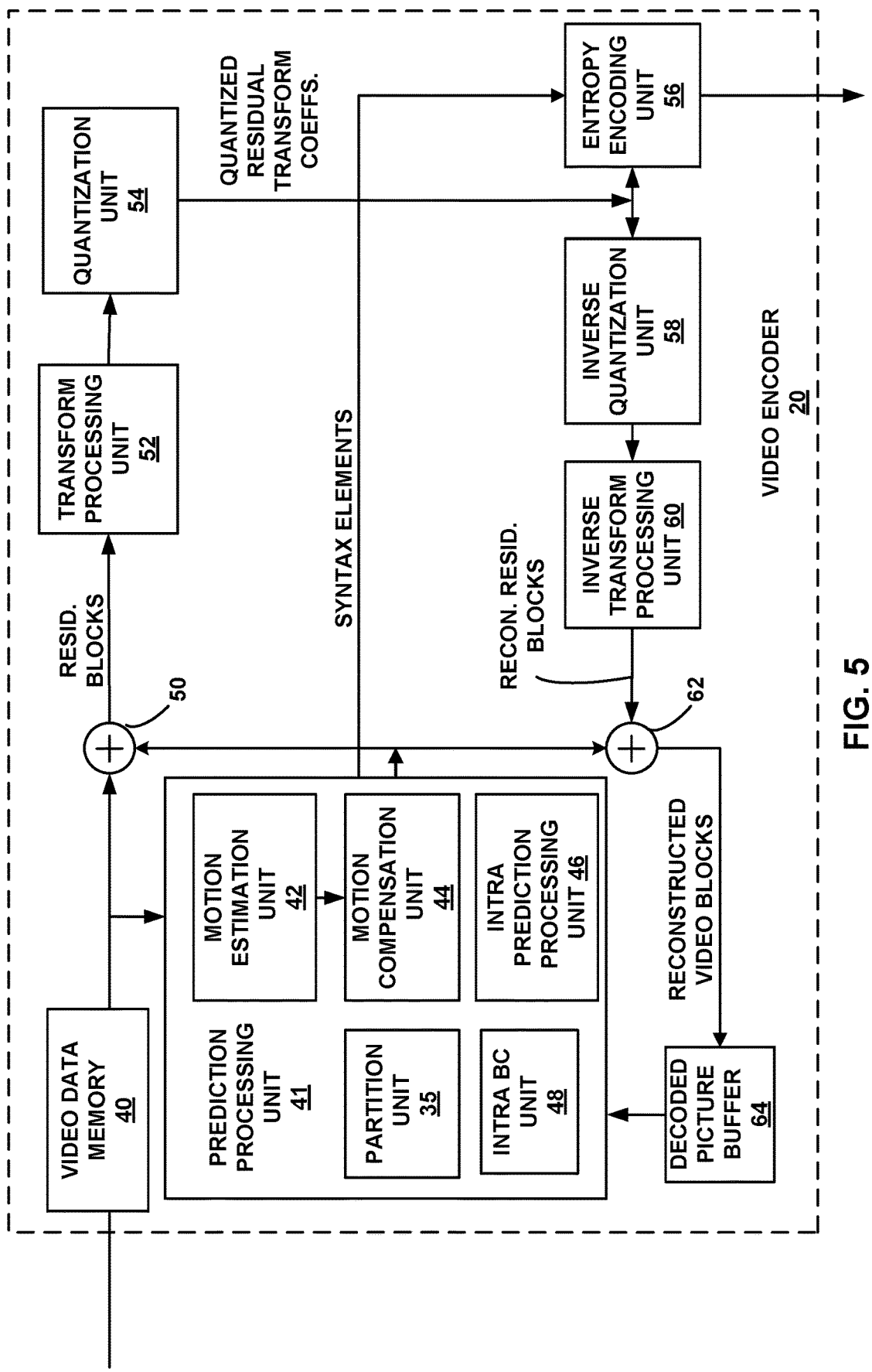
FIG. 5 is a block diagram illustrating an example video encoder that may implement the techniques described in this disclosure.

FIG. 5 is a block diagram illustrating an example video encoder 20 that may implement the techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra prediction mode (I mode) may refer to any of several spatial based compression modes.

In the example of FIG. 5, video encoder 20 includes video data memory 40, prediction processing unit 41, decoded picture buffer (DPB) 64, summer 50, transform processing unit 52, quantization unit 54, and entropy encoding unit 56. Prediction processing unit 41 includes partition unit 35, motion estimation unit 42, motion compensation unit 44, intra BC unit 48, and intra prediction processing unit 46. For video block reconstruction, video encoder 20 also includes inverse quantization unit 58, inverse transform processing unit 60, and summer 62. An in-loop filter (not pictured) may be positioned between summer 62 and DPB 64.

In various examples, a fixed and/or programmable hardware unit of video encoder 20 may be tasked to perform the techniques of this disclosure. Also, in some examples, the techniques of this disclosure may be divided among one or more of the illustrated fixed or programmable hardware units of video encoder 20 shown in FIG. 5, though other devices may also perform the techniques of this disclosure.

Video data memory 40 may store video data to be encoded by the components of video encoder 20. The video data stored in video data memory 40 may be obtained, for example, from video source 18. DPB 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 5, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

Although video encoder 20 is shown with Intra BC unit 48, the techniques of this disclosure may be performed by video encoders that do not encode video data using an Intra BC mode. Such video encoders may, for example, only encode video blocks in intra and inter modes, or may use other modes, such as palette modes, not described in this disclosure. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

In some examples, intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Whether the predictive video block is from the same picture according to Intra BC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra prediction processing unit 46 may intra-predict a current block, as an alternative to the inter-prediction performed by motion estimation unit 42 and motion compensation unit 44, or the Intra BC prediction performed by intra BC unit 48, as described above. In particular, intra prediction processing unit 46 may determine an intra prediction mode, including an Intra BC mode, to use to encode a current block. In some examples, intra prediction processing unit 46 may encode a current block using various intra prediction modes, e.g., during separate encoding passes, and intra prediction processing unit 46 (or a mode select unit, in some examples) may select an appropriate intra prediction mode to use from the tested modes. As part of determining an intra prediction mode, intra prediction processing unit 46 may construct an MPM candidate list according to the techniques of this disclosure. Intra prediction processing unit 46 may select as the intra prediction mode for a particular block either an intra prediction mode in the MPM candidate list or a non-most probable mode not in the MPM candidate list.

Intra prediction processing unit 46 may, for example, calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. For blocks that are encoded using an intra prediction mode, entropy encoding unit 56 may, for example, select one or more contexts for encoding the information indicating if the actual intra prediction mode is a mode in the MPM candidate list.

After prediction processing unit 41 generates the predictive block for the current video block via either inter prediction or intra prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. Entropy encoding unit 56 also may entropy encode various syntax elements. For example, entropy encoding unit 56 may perform CABAC, context adaptive variable length coding (CAVLC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block for prediction of other video blocks. Motion compensation unit 44 and/or intra BC unit 48 may calculate a reference block by adding the residual block to a predictive block of one of the reference pictures within one of the reference picture lists. Motion compensation unit 44 and/or intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reference block for storage in DPB 64. The reference block may be used by intra BC unit 48, motion estimation unit 42 and motion compensation unit 44 as a reference block to inter predict a block in a subsequent video frame or picture.

Figure 6:
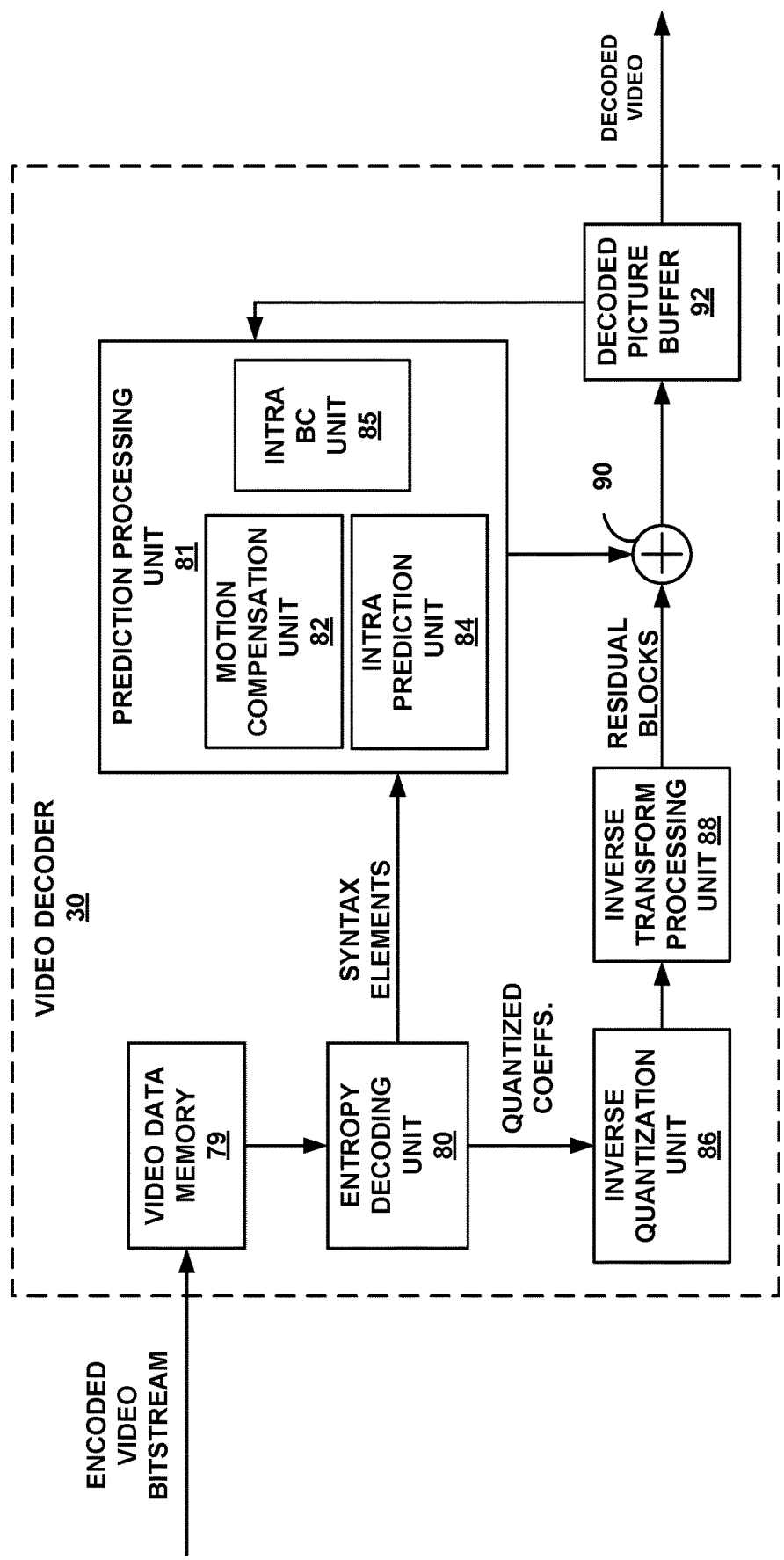
FIG. 6 is a block diagram illustrating an example video decoder that may implement the techniques described in this disclosure.

FIG. 6 is a block diagram illustrating an example video decoder 30 that may implement the techniques described in this disclosure. In the example of FIG. 6, video decoder 30 includes video data memory 79, entropy decoding unit 80, prediction processing unit 81, inverse quantization unit 86, inverse transform processing unit 88, summer 90, and DPB 92. Prediction processing unit 81 includes intra BC unit 85, motion compensation unit 82 and intra prediction processing unit 84. Video decoder 30 may, in some examples, perform a decoding pass generally reciprocal to the encoding pass described with respect to video encoder 20 from FIG. 5.

Video data memory 79 may store video data, such as an encoded video bitstream, to be decoded by the components of video decoder 30. The video data stored in video data memory 79 may be obtained, for example, from storage device 32, from a local video source, such as a camera, via wired or wireless network communication of video data, or by accessing physical data storage media. Video data memory 79 may form a coded picture buffer (CPB) that stores encoded video data from an encoded video bitstream. DPB 92 stores reference video data for use in decoding video data by video decoder 30 (e.g., in intra or inter coding modes, also referred to as intra or inter prediction coding modes). Video data memory 79 and DPB 92 may be formed by any of a variety of memory devices, such as DRAM, including SDRAM, MRAM, RRAM, or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice or for intra coded blocks in other types of slices, intra prediction processing unit 84 of prediction processing unit 81 may generate prediction data for a video block of the current video slice based on a signaled intra prediction mode and data from previously decoded blocks of the current frame or picture. Intra prediction processing unit 84 may be configured to implement the techniques of this disclosure for performing intra prediction. More specifically, intra prediction processing unit 84 may be configured to generate an MPM candidate list according to the MPM candidate list construction techniques described herein. When the video frame is coded as an inter coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

In other examples, when the video block is coded according to the Intra BC mode described herein, intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from DPB 92. Although video decoder 30 is shown with Intra BC unit 85, the techniques of this disclosure may be performed by video decoders that do not decode video data using an Intra BC mode. Such video decoders may, for example, only decode video blocks in intra and inter modes, or may use other modes, such as palette modes, not described in this disclosure.

Motion compensation unit 82 and/or intra BC unit 85 may determine prediction information for a video block of the current video slice by parsing the motion vectors and other syntax elements, and use the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Similarly, intra BC unit 85 may use some of the received syntax elements, e.g., a flag, to determine that the current video block was predicted using the Intra BC mode, construction information indicating which video blocks of the picture are within the reconstructed region and should be stored in DPB 92, block vectors for each Intra BC predicted video block of the slice, Intra BC prediction status for each Intra BC predicted video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks. Video decoder 30 may be configured to decode blocks coded in merge mode and/or AMVP mode, in which case prediction processing unit 81 may be configured to assemble the same candidate lists assembled by video encoder 20.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and intra BC unit 85. Summer 90 represents the component or components that perform this summation operation to produce reconstructed video blocks.

Summer 90 represents the component or components that perform this summation operation. An in-loop filter (not pictured) may be positioned between summer 90 and DPB 92. The decoded video blocks in a given frame or picture are then stored in DPB 92, which stores reference pictures used for subsequent motion compensation. DPB 92, or a memory device separate from DPB 92, may also store decoded video for later presentation on a display device, such as display device 34 of FIG. 1.

Figure 7A:
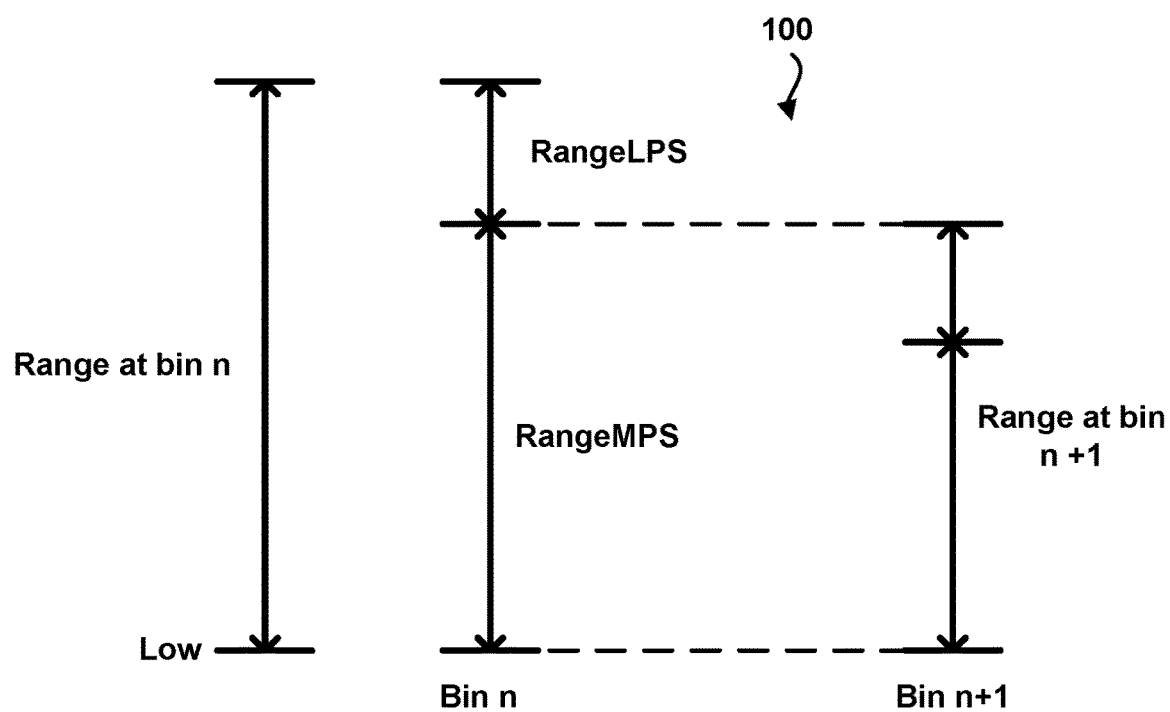
FIGS. 7A and 7B are conceptual diagrams illustrating a range update process in binary arithmetic coding.
Figure 7B:
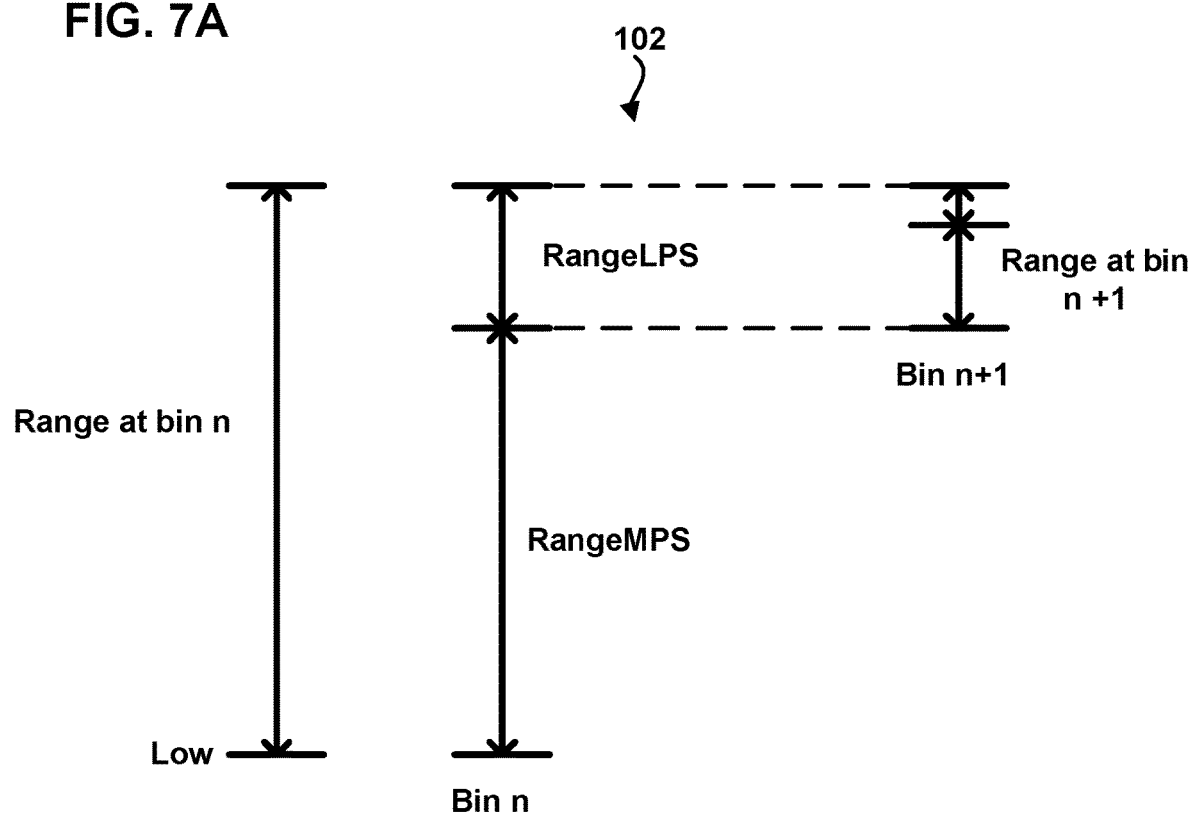

FIGS. 7A and 7B show examples of a CABAC process at a bin n. In example 100 of FIG. 7A, at bin n the range at bin 2 includes the RangeMPS and RangeLPS given by the probability of the least probable symbol (LPS) (pa) given a certain context state ($\sigma$). Example 100 shows the update of the range at bin n+1 when the value of bin n is equal to the most probable symbol (MPS). In this example, the low stays the same, but the value of the range at bin n+1 is reduced to the value of RangeMPS at bin n. Example 102 of FIG. 7B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

Figure 8:
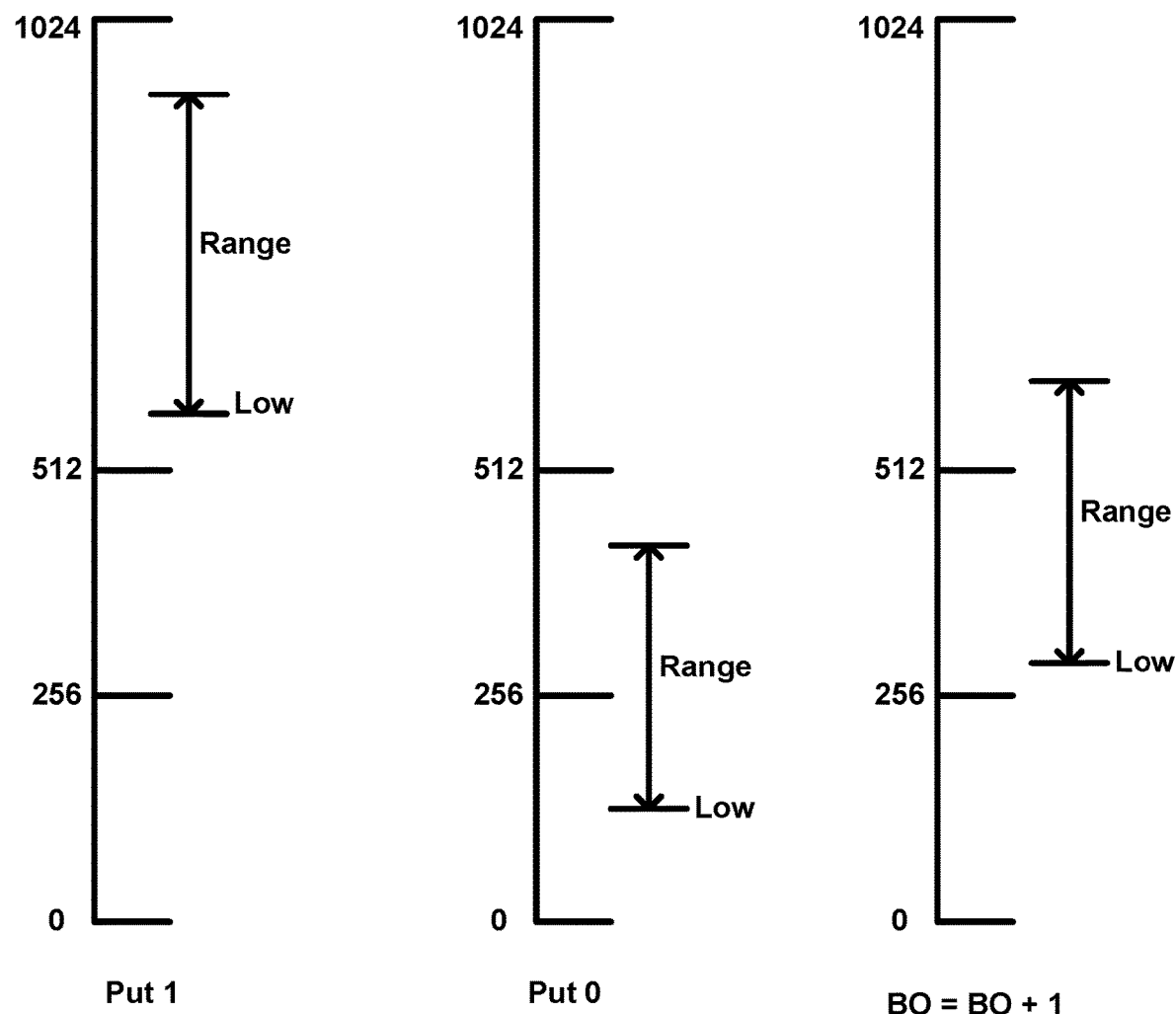
FIG. 8 is a conceptual diagram illustrating an output process in binary arithmetic coding.

In one example of the HEVC video coding process, range is expressed with 9 bits and the low with 10 bits. There is a renormalization process to maintain the range and low values at sufficient precision. The renormalization occurs whenever the range is less than 256. Therefore, the range is always equal or larger than 256 after renormalization. Depending on the values of range and low, the binary arithmetic coder (BAC) outputs to the bitstream, a '0,' or a '1,' or updates an internal variable (called BO: bits-outstanding) to keep for future outputs. FIG. 8 shows examples of BAC output depending on the range. For example, a '1' is output to the bitstream when the range and low are above a certain threshold (e.g., 512). A '0' is output to the bitstream when the range and low are below a certain threshold (e.g., 512). Nothing is output to the bitstream when the range and lower are between certain thresholds. Instead, the BO value is incremented and the next bin is encoded.

In the CABAC context model of H.264/AVC and in some examples of HEVC, there are 128 states. There are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

To reduce the computation of deriving LPS ranges (rangeLPS$_\sigma$), results for all cases may pre-calculated and stored as approximations in a look-up table. Therefore, the LPS range can be obtained without any multiplication by using a simple table lookup. Avoiding multiplication can be important for some devices or applications, since this operation may cause significant latency in many hardware architectures.

A 4-column pre-calculated LPS range table may be used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

Range Index

| Range | 256-319 | 320-383 | 384-447 | 448-511 |
|---|---|---|---|---|
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

RangeLPS

| Prob State ($\sigma$) | RangeLPS | | | |
|---|---|---|---|---|
| | Index 0 | Index 1 | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state$_\sigma$ is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability p for each state is derived as follows:

$$p_\sigma = \alpha p_{\sigma-1}$$

where the state σ is from 0 to 63. The constant α represents the amount of probability change between each context state. In one example, α=0.9493, or, more precisely, $\alpha = (0.01875/0.5)^{1/63}$. The probability at state α=0 is equal to 0.5 (i.e., $p_0$=1/2). That is, at context state 0, the LPS and MPS are equally probable. The probability at each successive state is derived by multiplying the previous state by α. As such, the probability of the LPS occurring at context state α=1 is $p_0$*0.9493 (0.5*0.9493=0.47465). As such, as the index of state α increases, the probability of the LPS occurring goes down.

CABAC is adaptive because the probability states are updated in order to follow the signal statistics (i.e., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index may be incremented by 1. This is for all states except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of a LPS with the following exception. Assuming a LPS has been encoded at the state with index σ=0, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$p_{new} = \max(\alpha\, p_{old}, p_{62})$ if a MPS occurs $p_{new} = (1-\alpha) + \alpha\, p_{old}$ if a LPS occurs With regard to a practical implementation of the probability estimation process in CABAC, it is important to note that all transition rules may be realized by at most two tables each having 63 entries of 6-bit unsigned integer values. In some examples, state transitions may be determined with a single table TransIdxLPS, which determines, for a given state index σ, the new updated state index TransIdxLPS [σ] in case an LPS has been observed. The MPS-driven transitions can be obtained by a simple (saturated) increment of the state index by the fixed value of 1, resulting in an updated state index min(σ+1, 62). Table 3 below is an example of a partial TransIdxLPS table.

TABLE 3

| TransIdxLPS | |
|---|---|
| Prob State (σ) | New State TransIdxLPS [σ] |
| ... | ... |
| 9 | 6 |
| 10 | 8 |
| 11 | 8 |
| 12 | 8 |
| ... | ... |

One problem with previous BAC approaches (e.g., the BAC approach used in H.264/AVC), is that the tables RangeLPS and TransIdxLPS are tuned for low resolution videos, (i.e., common intermediate format (CIF) and quarter-CIF (QCIF) videos). Currently, a large amount of video content is high definition (HD) and, in some cases, greater than HD. Video content that is HD or greater than HD resolution has different statistics than the 10-year-old QCIF sequences used to develop H.264/AVC.

As such, tables RangeLPS and TransIdxLPS from H.264/AVC may cause adaptation between states in a manner that is too quick. That is, the transitions between probability states, especially when an LPS occurs, can be too great for the smoother, higher resolution content of HD video. Thus, the probability models used according to conventional techniques are not as accurate for HD and extra-HD content. In addition, as HD video content includes a greater range of pixel values, the H.264/AVC tables do not include enough entries to account for the more extreme values that may be present in HD content.

As such, there is a need for the RangeLPS and TransIdxLPS tables to be modified to account for the characteristics of this new content. This also implies that BAC should be different in at least two aspects. One difference is that BAC processes should use tables that allow for a slower adaptation process. Another difference is that BAC processes should account for more extreme cases (i.e., skewed probabilities).

The current RangeLPS and TransIdxLPS tables can be modified to achieve these goals by simply including more probability states and ranges. However, this solution incurs a substantial increase in the sizes of the tables. Slower adaptation may be achieved by using a parameter α closer to 1 than the currently used parameter α (e.g., α=0.9493). However, using a larger value of α causes the probabilities to tend to 0 more slowly, and as such, more states are needed. In addition, to achieve slower adaptation, it may be beneficial if the lowest possible probability is much lower than the currently used lowest probability. As such, even more states may be needed to reach that very low probability value.

In view of the foregoing problems, this disclosure proposes techniques to modify BAC so as to attain slower adaptation and more skewed probabilities while keeping the table sizes (e.g., the RangeLPS and TransIdxLPS tables) at a practical level. In other words, this disclosure describes techniques to achieve slower adaptation and more extreme probabilities (i.e., probabilities closer to 0 and 1) while using relatively small-sized tables.

The techniques described in this disclosure may use more probability states, e.g., more probability states than used in BAC with H.264/AVC or HEVC. In this case, the TransIdxLPS table can obtain slower adaptation and lower probabilities. In one example, the techniques described in this disclosure may use 128 probability states instead of 64. This increases the table TransIdxLPS by 64 entries (i.e., 128 entries instead of 64). This increase allows for slower adaptation and lower minimal probability. As one example, by setting the parameter α=0.9689, the differences between contiguous probabilities become smaller. Additionally, the lowest minimum probability goes down to 0.009, which is around one-half of the H.264/AVC case (i.e., 0.01875). Other numbers of states and a values are also possible, though, in general, the number of states may be increased and the value of a may be closer to 1 than the H.264/AVC case of α=0.9493.

Another parameter that might be modified to improve HD or extra-HD coding is the parameter $p_0$. The value of $p_0$ generally indicates the maximum probability for the LPS. The reason to consider this possibility is that having a lower $p_0$ means that the minimal probability also decreases. The value of $p_0$ is set to 0.5 in the conventional BAC process. This disclosure proposes to allow for other values for $p_0$. Having other values of $p_0$ lower than 0.5 allows for smoother transitions at state 0 when the MPS/LPS swap occurs. In one example, $p_0$ may be equal to 0.493, although many other examples could also be used.

Usually, each probability state has its own entry in the RangeLPS table. The table size may be represented as:

probability states×# quantized range indexes which is 64×4=256 bytes in some proposals for HEVC. Since the number of states would increase in examples of this disclosure (doubled in the example above), the RangeLPS table size may be 128×4=512 bytes. To avoid this increase in the RangeLPS table size, however, this disclosure further proposes to map the probability states indexes to a lower size (i.e., a few number of indexes) to index the RangeLPS size. In other words, this disclosure proposes to decouple the state transition process from the range computation process. This means, in the current example, that there is a map for the states to range computation. Video encoder 20 and/or video decoder 30 may be configured to map an index indicating the determined probability state to one of a plurality of grouped indexes (e.g., grouped index for a RangeLPS table), with at least one of the grouped indexes representing at least two of the plurality of probability states. As such, the RangeLPS table (or other BAC tables) may use fewer indexes than there are probability states.

In one example of the disclosure, the probability state number may be divided by two to generate a new index to use as an entry for the RangeLPS table. In this case, the 128 probability states are reduced to 64 entries. Consequently, the RangeLPS table can keep the current size as used in H.264/AVC. Therefore, instead of using the probability state σ to index the entry in the range LPS table, the techniques described in this disclosure employ (σ>>1), that is, the state σ is divided by two and rounded to the lower integer for use as a grouped index into the RangeLPS table. The division can be by a larger number if the RangeLPS table is desired to be smaller for a given implementation, or if the number of states is larger (e.g., 256 probability states). In this context, each grouped index represents two probability states. In other examples of the disclosure, the grouped indexes may represent two or more probability states.

From an optimal entropy point of view, the grouping of the states for the RangeLPS table by using the division or right bit-shift operation may be beneficial, but may not always be the optimal technique. The optimal grouping may depend on several factors, including the number of states and the parameter α, among others. The most desirable (and possibly optimal) grouping might not be a straightforward operation like the bit-shift operation. In general, the grouping can be described with a table, going from the total number of probability states to a reduced number of probability states (i.e., grouped states). In another example, this disclosure proposes to use this kind of table. This approach would enhance performance (compared to the division or right shifting), at the cost of additional memory. As such, this example is a trade-off between memory and performance, favoring better performance over the linear mapping example (i.e., the division or right shifting).

Hence, although a linear mapping of probability states to entries in the RangeLPS table may be used, it may be desirable to provide a nonlinear mapping. For example, the probability states may be mapped according to a logarithmic mapping. A logarithmic mapping may be achieved, in some examples, using piecewise linear mapping techniques. In general, such a mapping may be defined using a table, such as a precomputed mapping table.

In general, the techniques described in this disclosure may be performed, in some examples, by a method or device for entropy coding video data. The method may include determining a probability state of symbols in a binary arithmetic coding process, where the probability state may be one of a plurality of probability states, and mapping an index indicating the determined probability state to one of a plurality of grouped indexes, where at least one of the grouped indexes represents at least two of the plurality of probability states, and where each of the grouped indexes points to a range for a lowest probability symbol in a table.

In some examples, the number of probability states may be greater than 64. For example, the number of probability states may be 128. In some examples, the number of grouped indexes used as an input into the RangeLPS table is 64. In particular, the number of probability states may be 128 and the number of grouped indexes used as an input into the RangeLPS table may be 64. A symbol may be coded based on the grouped indexes, e.g., according to a table based on the probability state index, or according to a mathematical operation based on the index. The determined probability state maps to one of a plurality of indexes according to a table, or according to a mathematical operation. The mapping may be linear or nonlinear. For example, the mapping may be performed according to a divide-by-two operation. In some examples, the mapping may be a logarithmic mapping. In some examples, a piecewise linear mapping may be used to define a logarithmic mapping. In some examples, the value $p_0$ of the maximum probability for the LPS may be less than 0.5.

The techniques described in this disclosure may be performed, for example, within a video encoder, video decoder, or combined video encoder-decoder (CODEC). In particular, such techniques may be performed in an entropy encoding unit of a video encoder and/or an entropy decoding unit of a video decoder. The techniques may be performed, for example, within a CABAC process, which may be configured to support video coding, such as video coding according to aspects of the HEVC standard Entropy encoding and decoding units may apply coding processes in a reciprocal or inverse manner, e.g., to encode or decode any of a variety of video data, such as quantized transform coefficients associated with residual video data, motion vector information, syntax elements, and other types of information that may be useful in a video encoding and/or video decoding process.

Figure 9:
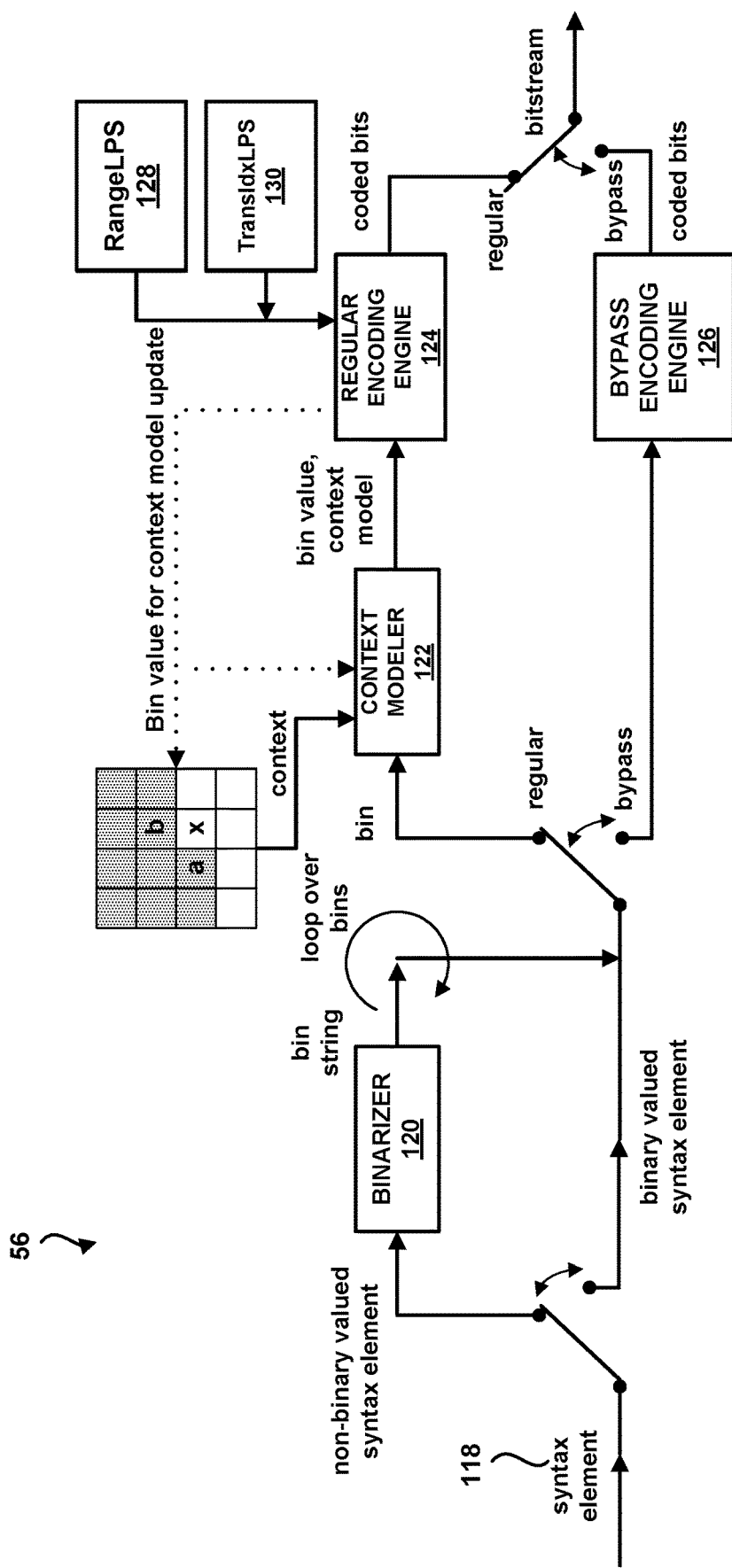
FIG. 9 is a block diagram illustrating a context adaptive binary arithmetic coding (CABAC) coder in a video encoder.

FIG. 9 is a block diagram of an example entropy encoding unit 56 that may be configured to perform CABAC in accordance with the techniques of this disclosure. A syntax element 118 is input into the entropy encoding unit 56. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 120. Binarizer 120 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 120 is fed to the binary arithmetic coding side of entropy encoding unit 56. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 126 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given the values of previously coded bins. The probability of a bin being an LPS is determined by context modeler 122. Context modeler 122 outputs the bin value and the context model (e.g., the probability state $\sigma$). The context model may be an initial context model for a series of bins, or may be determined based on the coded values of previously coded bins. As described above, the context modeler may update the state based on whether or not the previously-coded bin was an MPS or an LPS.

After the context model and probability state $\sigma$ are determined by context modeler 122, regular coding engine 124 performs BAC on the bin value. According to the techniques of this disclosure, regular coding engine 124 performs BAC using TransIdxLPS table 130 that includes more than 64 probability states $\sigma$. In one example, the number of probability states is 128. TransIdxLPS is used to determine which probability state is used for a next bin (bin n+1) when the previous bin (bin n) is an LPS. Regular coding engine 124 may also use a RangeLPS table 128 to determine the range value for an LPS given a particular probability state $\sigma$. However, according to the techniques of this disclosure, rather than using all possible probability states $\sigma$ of the TransIdxLPS table 130, the probability state indexes $\sigma$ are mapped to grouped indexes for use in the RangeLPS table. That is, each index into the RangeLPS table 128 may represent two or more of the total number of probability states. The mapping of probability state index $\sigma$ to grouped indexes may be linear (e.g., by dividing by two), or may be non-linear (e.g., a logarithmic function or mapping table).

In other examples of the disclosure, the difference between successive probability states may be made smaller by setting the parameter $\alpha$ to be greater than 0.9493. In one example, $\alpha$=0.9689. In another example of the disclosure, the highest probability ($p_0$) of an LPS occurring may be set to be lower than 0.5. In one example, $p_0$ may be equal to 0.493.

In accordance with one or more techniques of this disclosure, as opposed to using the same value of a variable used to update a probability state in a binary arithmetic coding process (e.g., one or more of a window size, a scaling factor ($\alpha$), and a probability updating speed), entropy encoding unit 56 may use different values of the variable for different context models and/or different syntax elements. For instance, entropy encoding unit 56 may determine, for a context model of a plurality of context models, a value of a variable used to update a probability state in a binary arithmetic coding process, and update the probability state based on the determined value.

Returning to FIG. 4, in some cases, the entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients. In addition, entropy encoding unit 56, or other processing units, also may code other data, such as the values of a quantization matrix.

As discussed above, inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

Figure 10:
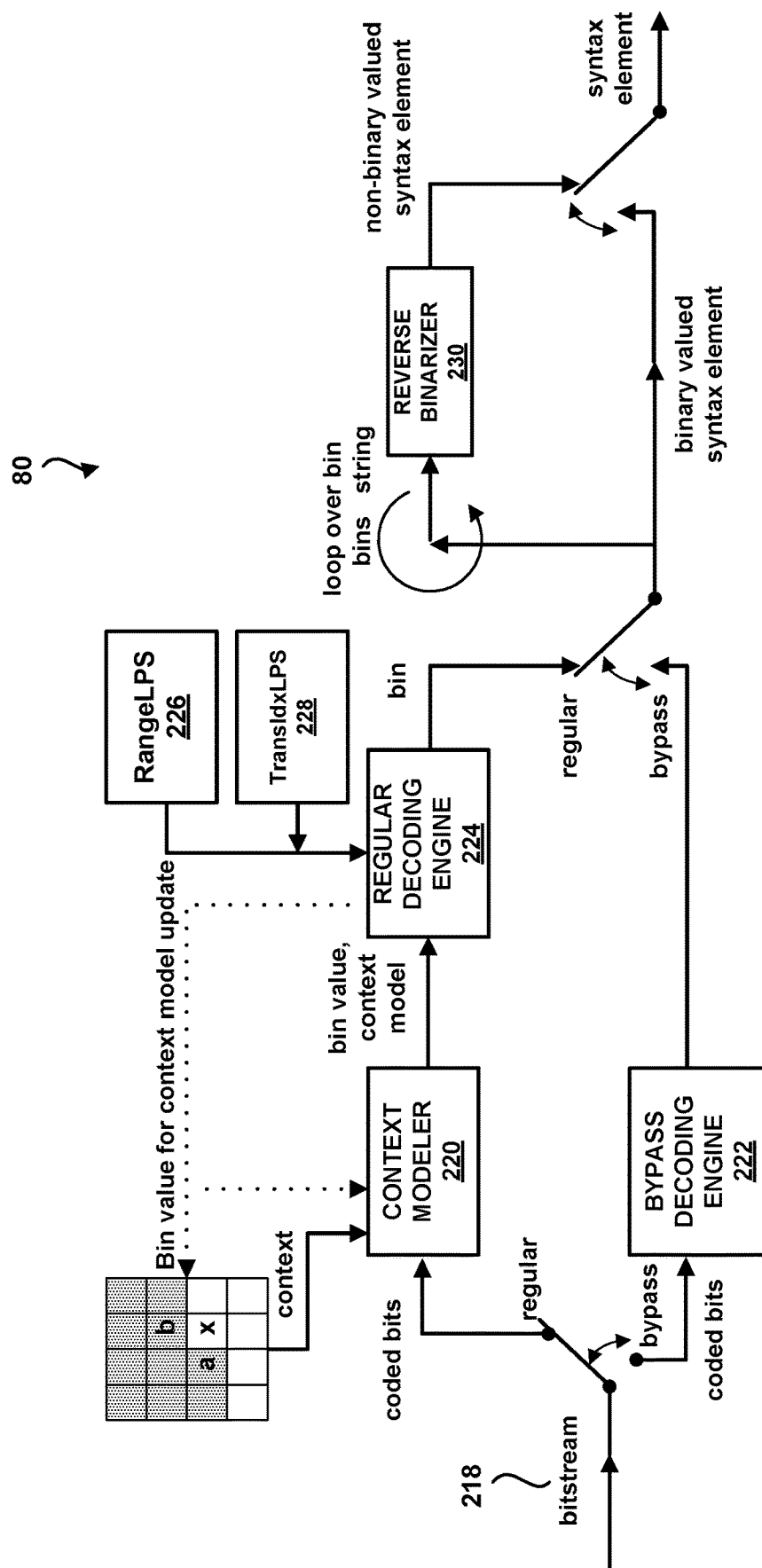
FIG. 10 is a block diagram illustrating a CABAC coder in a video decoder.

FIG. 10 is a block diagram of an example entropy decoding unit 80 that may be configured to perform CABAC in accordance with the techniques of this disclosure. The entropy decoding unit 80 of FIG. 10 performs CABAC in an inverse manner as that of entropy encoding unit 56 described in FIG. 5. Coded bits from bitstream 218 are input into entropy decoding unit 80. The coded bits are fed to either context modeler 220 or bypass coding engine 222 based on whether or not the coded bits were entropy coded using bypass mode or regular mode. If the coded bits were coded in bypass mode, bypass decoding engine 222 may, for example, use Golomb-Rice or exponential Golomb decoding to retrieve the binary-valued syntax elements or bins of non-binary syntax elements.

If the coded bits were coded in regular mode, context modeler 220 may determine a probability model for the coded bits and regular decoding engine 224 may decode the coded bits to produce bins of non-binary valued syntax elements (or the syntax elements themselves if binary-valued). After the context model and probability state $\sigma$ is determined by context modeler 220, regular decoding engine 224 performs BAC on the bin value. According to the techniques of this disclosure, regular decoding engine 224 performs BAC using TransIdxLPS table 228 that includes more than 64 probability states $\sigma$. In one example, the number of probability states is 128, although other numbers of probability states could be defined, consistent with the techniques of this disclosure. TransIdxLPS table 228 is used to determine which probability state is used for a next bin (bin n+1) when the previous bin (bin n) is an LPS. Regular decoding engine 224 may also use a RangeLPS table 226 to determine the range value for an LPS given a particular probability state σ. However, according to the techniques of this disclosure, rather than using all possible probability states σ of the TransIdxLPS table 228, the probability state indexes σ are mapped to grouped indexes for use in RangeLPS table 226. That is, each index into RangeLPS table 226 may represent two or more of the total number of probability states. The mapping of probability state index σ to grouped indexes may be linear (e.g., by dividing by two), or may be non-linear (e.g., a logarithmic function or mapping table).

In other examples of the disclosure, the difference between successive probability states may be made smaller by setting the parameter α to be greater than 0.9493. In one example, α=0.9689. In another example of the disclosure, the highest probability ($p_0$) of an LPS occurring may be set to be lower than 0.5. In one example, $p_0$ may be equal to 0.493.

After the bins are decoded by regular decoding engine 224, a reverse binarizer 230 may perform a reverse mapping to convert the bins back into the values of the non-binary valued syntax elements.

Figure 11:
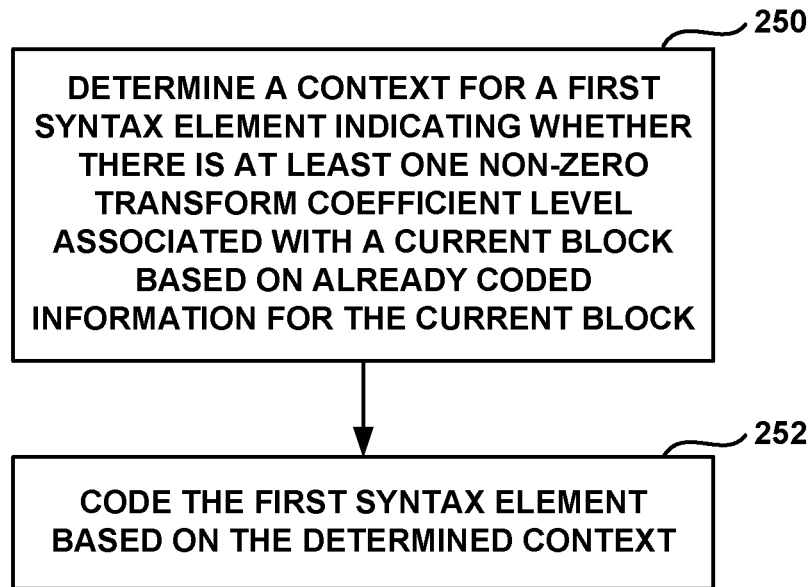
FIG. 11 is a flowchart illustrating an example method of coding video data in accordance with techniques described in this disclosure.

FIG. 11 is a flow diagram illustrating an example video coding technique described in this disclosure. The techniques of FIG. 11 will be described with reference to a generic video coder, such as but not limited to video encoder 20 or video decoder 30. In the example of FIG. 11 the video coder determines a context for a first syntax element indicating whether there is at least one non-zero transform coefficient level associated with a current block based on already coded information for the current (250).

The already coded information may, for example, include one or more of a coding mode of the block, such as whether the block is coded using an intra coding mode or an inter coding mode. The block may include a luma block, and the value for the first syntax element may indicate whether there is at least one non-zero transform coefficient level associated with the luma block. The block may include a chroma block, and the value for the first syntax element may indicate whether there is at least one non-zero transform coefficient level associated with the chroma block. In some examples, the block may include a chroma block and a luma block, and the value for the first syntax element may indicate whether there is at least one non-zero transform coefficient level associated with at least one of the chroma block or the luma block. In some examples, the already coded information may include a size or shape of the block.

The video coder codes the first syntax element based on the determined context (252). To code the first syntax element based on the determined context, the video coder may, for example, perform CABAC operation on the first syntax element. In examples where the video coder is a video encoder, then as part of coding the first syntax element based on the determined context, the video encoder may output a bitstream of encoded video data that includes the first syntax element. In examples where the video coder is a video decoder, then as part of coding the first syntax element based on the determined context, the video decoder may receive a bitstream of encoded video data that includes the first syntax element and determine the value for the first syntax element.

In some examples, the video coder may determine a context for a merge flag for a second block based on the value of the first syntax element. The second block may, for example, be a neighboring block of the first block and be coded after the first block.

Figure 12:
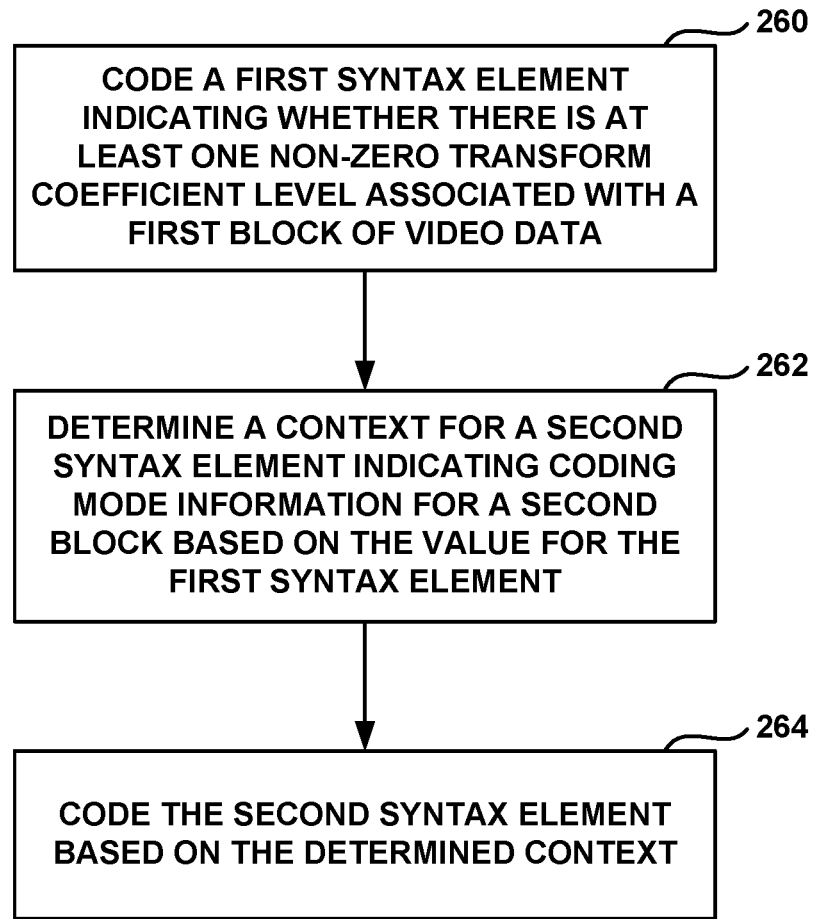
FIG. 12 is a flowchart illustrating an example method of coding video data in accordance with techniques described in this disclosure.

FIG. 12 is a flow diagram illustrating an example video coding technique described in this disclosure. The techniques of FIG. 12 will be described with reference to a generic video coder, such as but not limited to video encoder 20 or video decoder 30. In the example of FIG. 12 the video coder codes a first syntax element indicating whether there is at least one non-zero transform coefficient level associated with a first block of video data (260).

The video coder determines a context for a second syntax element indicating coding mode information for a second block based on the value for the first syntax element (262). The video coder may, for example, determine the context for the second syntax element indicating the coding mode information for the second block from at least two available contexts. The second syntax element may, for example, be a merge flag for the second block or a syntax element indicating a prediction mode for the second block. In some examples, the first block and the second block may be spatially neighboring blocks. In some examples, the first block may be in a reference picture and the second block in a current picture, and the first block may be co-located relative to the second block. In some examples, first block may in a reference picture and the second block in a current picture, and the first block may neighbor a block that is co-located relative to the second block. The first block and the second block may either both be luma blocks or both be chroma blocks.

The video codes the second syntax element based on the determined context (264). To code the second syntax element based on the determined context, the video coder may, for example, perform CABAC operation on the second syntax element. In examples where the video coder is a video encoder, then as part of coding the second syntax element based on the determined context, the video encoder may output a bitstream of encoded video data that includes the second syntax element. In examples where the video coder is a video decoder, then as part of coding the first syntax element based on the determined context, the video decoder may receive a bitstream of encoded video data that includes the second syntax element and determine the value for the second syntax element.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   determining a context for a first syntax element for a current block of video data based on a coding mode of the current block, wherein the coding mode comprises one of an intra coding mode or an inter coding mode, wherein a value for the first syntax element indicates whether there is at least one non-zero transform coefficient level associated with the current block of video data;
   determining a probability model based on the determined context for the first syntax element; and
   context coding the first syntax element based on the determined probability model.

2. The method of claim 1, wherein the current block comprises a luma block, and wherein the value for the first syntax element indicates whether there is at least one non-zero transform coefficient level associated with the luma block.

3. The method of claim 1, wherein the current block comprises a chroma block, and wherein the value for the first syntax element indicates whether there is at least one non-zero transform coefficient level associated with the chroma block.

4. The method of claim 1, wherein the current block comprises a chroma block and a luma block, and wherein the value for the first syntax element indicates whether there is at least one non-zero transform coefficient level associated with at least one of the chroma block or the luma block.

5. The method of claim 1, wherein the current block of video data comprises a first block, the method further comprising:
   determining a context for a merge flag for a second block based on the value of the first syntax element, wherein the second block is a neighboring block of the first block and is coded after the first block.

6. The method of claim 1, wherein context coding the first syntax element based on the determined probability model comprises performing a context-adaptive binary arithmetic coding (CABAC) operation on the first syntax element.

7. The method of claim 1, wherein coding comprises encoding, and wherein context coding the first syntax element based on the determined probability model comprises outputting a bitstream of encoded video data comprising the first syntax element.

8. The method of claim 1, wherein coding comprises decoding, and wherein context coding the first syntax element based on the determined probability model comprises receiving a bitstream of encoded video data comprising the first syntax element and determining the value for the first syntax element.

9. A device for coding video data, the device comprising:
   a memory; and
   one or more processors configured to:
   determine a context for a first syntax element for a current block of video data based on a coding mode of the current block, wherein the coding mode comprises one of an intra coding mode or an inter coding mode, wherein a value for the first syntax element indicates whether there is at least one non-zero transform coefficient level associated with the current block of video data;
   determine a probability model based on the determined context for the first syntax element;
   context code the first syntax element based on the determined probability model.

10. The device of claim 9, wherein the current block comprises a luma block, and wherein the value for the first syntax element indicates whether there is at least one non-zero transform coefficient level associated with the luma block.

11. The device of claim 9, wherein the current block comprises a chroma block, and wherein the value for the first syntax element indicates whether there is at least one non-zero transform coefficient level associated with the chroma block.

12. The device of claim 9, wherein the current block comprises a chroma block and a luma block, and wherein the value for the first syntax element indicates whether there is at least one non-zero transform coefficient level associated with at least one of the chroma block or the luma block.

13. The device of claim 9, wherein the current block of video data comprises a first block, and wherein the one or more processors are further configured to:
   determine a context for a merge flag for a second block based on the value of the first syntax element, wherein the second block is a neighboring block of the first block and is coded after the first block.

14. The device of claim 9, wherein to context code the first syntax element based on the determined probability model, the one or more processors are configured to perform a context-adaptive binary arithmetic coding (CABAC) operation on the first syntax element.

15. The device of claim 9, wherein the device comprises a video encoder, and wherein to context code the first syntax element based on the determined probability model, the one or more processors are further configured to output a bitstream of encoded video data comprising the first syntax element.

16. The device of claim 9, wherein device comprises a video decoder, and wherein to context code the first syntax element based on the determined probability model, the one or more processors are further configured to receive a bitstream of encoded video data comprising the first syntax element and determining the value for the first syntax element.

* * * * *